(12) United States Patent
Yurman et al.

(10) Patent No.: US 6,408,493 B1
(45) Date of Patent: Jun. 25, 2002

(54) JEWELRY CLASP

(75) Inventors: David Yurman, New York; Don Johnson, Rego Park, both of NY (US)

(73) Assignee: Yurman Design Inc., New York, NY (US)

(*) Notice: Subject to any disclaimer, the term of this patent is extended or adjusted under 35 U.S.C. 154(b) by 0 days.

(21) Appl. No.: 09/602,358

(22) Filed: Jun. 22, 2000

(51) Int. Cl.$^7$ ............................................. F16B 45/04
(52) U.S. Cl. ......................................................... 24/600.4
(58) Field of Search ........................... 24/600.4, 600.8, 24/600.7, 374, 528, 601.6, 598.4, 599.3, 600.6, 905; 294/82.23; D11/87; 63/3.1, 3.2

(56) References Cited

U.S. PATENT DOCUMENTS

| | | | | |
|---|---|---|---|---|
| 643,924 A | * | 2/1900 | Vannote |
| 652,556 A | * | 6/1900 | Gavitt |
| 737,384 A | * | 8/1903 | Gavitt |
| 1,062,653 A | * | 5/1913 | Koons |
| 1,078,434 A | * | 11/1913 | Haga |
| 1,303,048 A | * | 5/1919 | Elliott |
| 1,398,887 A | * | 11/1921 | Bond |
| 3,859,693 A | * | 1/1975 | Breed |
| 4,097,970 A | * | 7/1978 | Cagnato |
| 4,819,306 A | * | 4/1989 | Kasai |
| 5,293,673 A | * | 3/1994 | Murai |
| 5,297,321 A | * | 3/1994 | Murai |
| 5,522,529 A | | 6/1996 | Yurman |
| D371,314 S | | 7/1996 | Yurman |
| 5,586,374 A | * | 12/1996 | Nishida |
| 5,860,198 A | * | 1/1999 | Buntin, Jr. |

FOREIGN PATENT DOCUMENTS

CH            295177        *  2/1954

* cited by examiner

Primary Examiner—James R. Brittain
(74) Attorney, Agent, or Firm—Maxim H. Waldbaum; Salans

(57) ABSTRACT

A novel clasp comprises a casing at least partially hollow, an insert and a pin. The casing includes an opening at one end leading to a recess within the casing for securing a loop to be restrained by the clasp. The insert is contained within the hollow of the casing and includes two holes which act in conjunction with the pin to allow the insert to move between first and second stop positions within the casing. In one position the leading edge occludes the opening in the casing, thus closing the clasp. In a second position the leading edge of the insert is retracted within the casing, exposing the opening in the casing, thus opening the clasp. The pin is fixed within the casing and rests within one of the two stop positions of the insert.

9 Claims, 3 Drawing Sheets

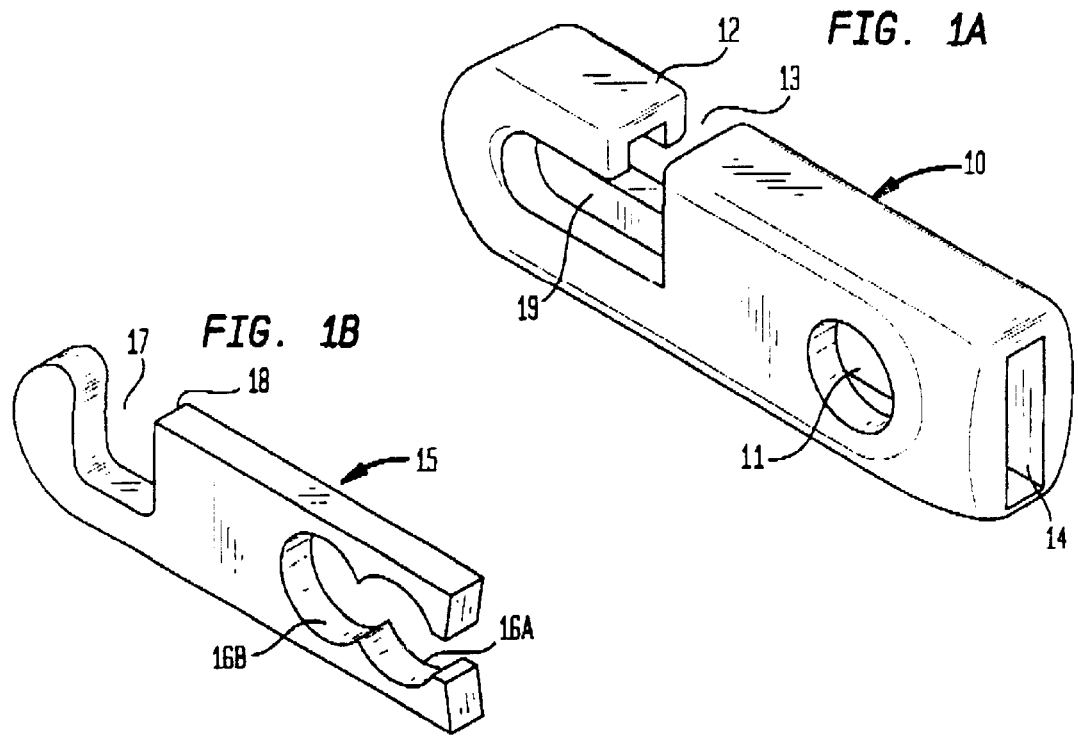
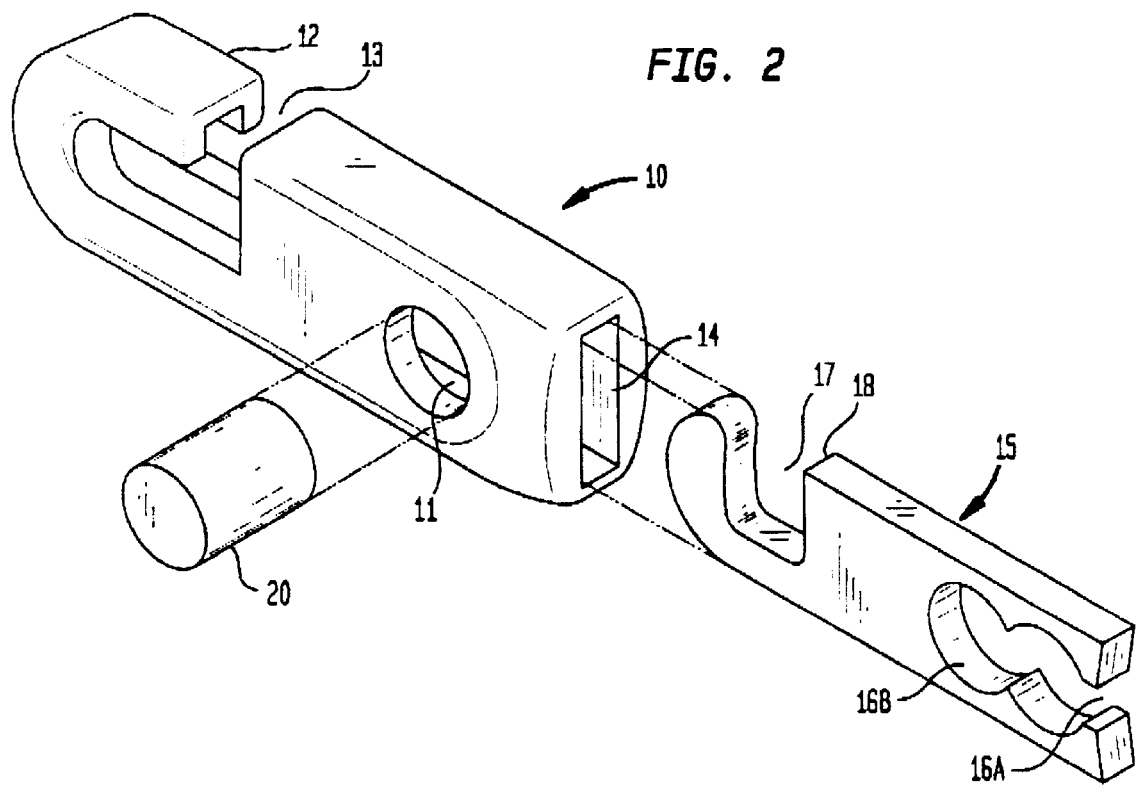

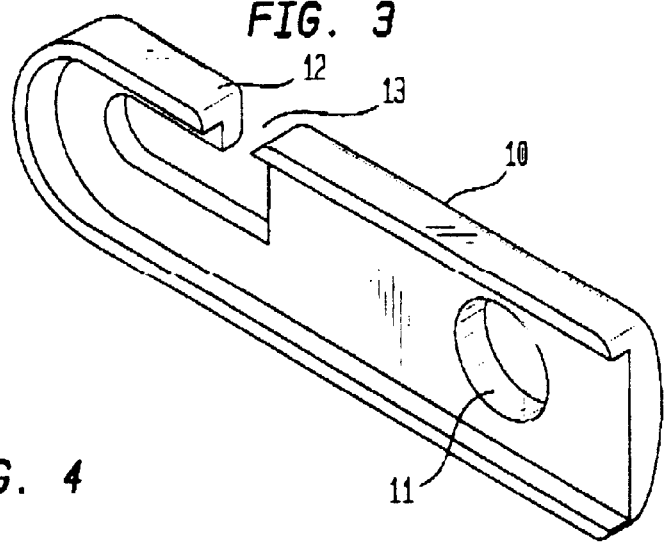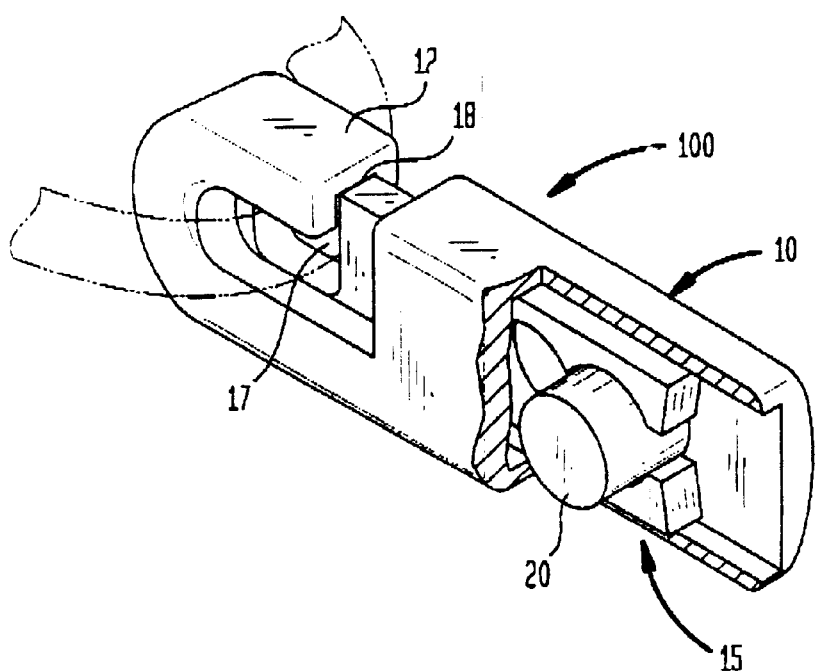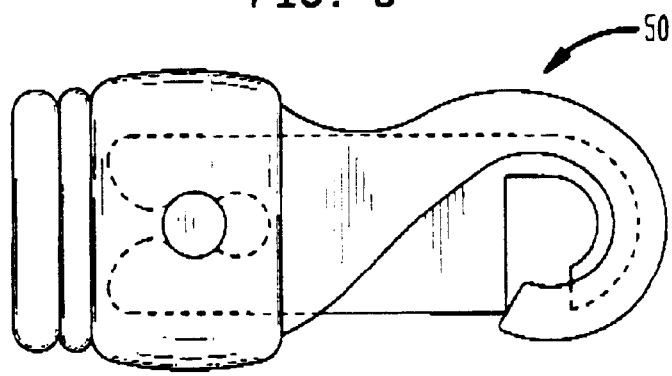

FIG. 6
FIG. 7
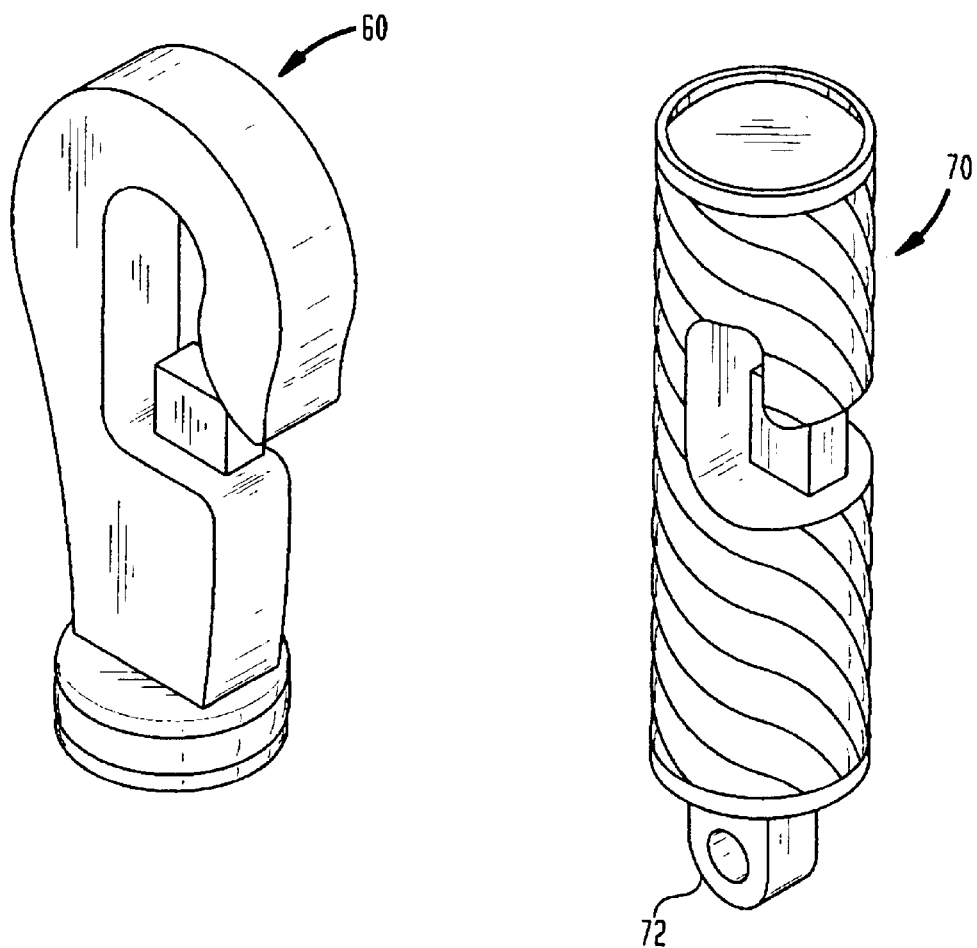
FIG. 8
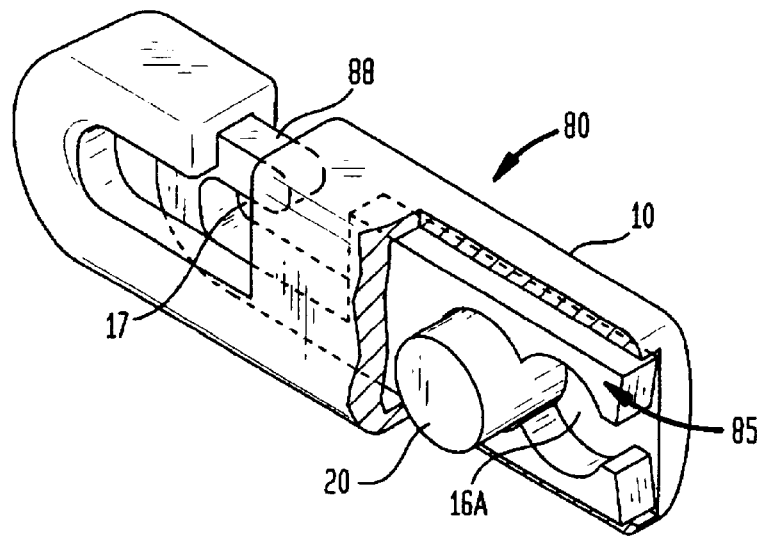

JEWELRY CLASP

FIELD OF THE INVENTION

The present invention relates to the field of jewelry and more specifically to a new clasp which in one preferred embodiment finds utility for use with jewelry.

SUMMARY OF THE INVENTION

The clasp of the present invention comprises three principle components: a casing; an insert and a pin. The casing is at least partially hollow and includes an opening through its outer surface and leading to a recess within the casing. A loop to be restrained within the clasp passes through the opening and resides within the recess. The clasp is formed with the insert inside the hollow of the casing.

The insert is movable within the casing between a first stop position and a second stop position. These two stops are delimited by two holes at one end (the trailing end) of the insert. These two holes are connected by a channel through which the pin can pass.

The pin is fixed in position. Each of the two ends of the pin is fixed to the inside of two opposing lateral walls within the hollow of the casing. The pin thus runs through the hollow, perpendicular to the direction in which the insert is movable between the first and second stops. The casing, insert and pin are assembled such that the pin passes through the insert anywhere between the first and second holes.

In operation, the insert is brought into one of its two stop positions, referred to herein as the open position. A loop is allowed to pass through the opening and into the recess within the casing. The insert can then be moved into its second position, the closed position. In this position the insert passes through the opening in the casing thereby blocking the opening so as to prevent the loop from slipping out of the clasp.

BRIEF DESCRIPTION OF THE DRAWINGS

FIG. 1A represents one embodiment of the casing of the clasp of the present invention.

FIG. 1B represents one embodiment of the insert of the clasp of the present invention.

FIG. 2 depicts the assembly of the components of one embodiment of the clasp of the present invention.

FIG. 3 is a perspective view of the inside of the casing of FIG. 1A.

FIG. 4 is a breakaway view of the assembled clasp of FIG. 2 in the closed position.

FIG. 5 depicts a second decorative embodiment of the clasp of the present invention.

FIG. 6 depicts a third decorative embodiment of the clasp of the present invention.

FIG. 7 depicts a fourth decorative embodiment of the clasp of the present invention.

FIG. 8 depicts a fifth embodiment of the clasp of the present invention wherein the open and closed stops of the insert are transposed from the embodiment of FIG. 2.

DETAILED DESCRIPTION OF THE INVENTION

The present invention is a novel clasp which in one advantageous embodiment is useful as a jewelry clasp to secure a loop from a bracelet, necklace and the like. The clasp of the present invention comprises three principle components. Referring to FIG. 1A, the first principle component, a casing 10, is shown. As described below there are many nonessential elements that may comprise the casing. However, all embodiments share the following features. First the casing must be at least partially hollow in order for insert 15 of FIG. 2 to fit in. An inside view of the casing 10 is shown in FIG. 3. Opening 13 must be large enough to allow a loop to be restrained by the clasp, to slip through. Similarly, recess 19 must be large enough for the loop to be used with the clasp, as shown by the hidden lines in FIG. 4.

Referring to FIG. 1B, one embodiment of insert 15 is shown. The essential components of insert 15 include: (i) being a size that fits within the hollow of casing 10; (ii) having a first stop position 16A and a second stop position 16B at the trailing edge of insert 15; and (iii) a leading edge 13 which for the embodiment of FIGS. 1–4 is used to block opening 13 of casing 10.

As can be seen in FIGS. 2 and 4, pin 20 can pass through opening 11 at one lateral side of casing 10, through stop 16A or 16B of insert 15 and then opening 11 in the opposing lateral side of casing 10. Stops 16A and 16B are designed so that with some pressure pin 20 can pass from one to the other and in the absence of pressure, pin 20 will rest in one of the stops, 16A or 16B. In reality, pin 20 is fixed in position and insert 15 is made to move between a first position where pin 20 rests in stop 16A and a second position where pin 20 rests in stop 16B.

In one advantageous embodiment of the present invention, insert 15 is made of a material and dimensions such that the passage between 16A and 16B is too narrow for pin 20 to pass through without applied pressure. However, with applied pressure the trailing edge of insert 15 will flex, widening the passage between stops 16A and 16B to allow pin 20 to pass through. Clearly, many possible design variations exist for stops 16A and 16B and the passage between them, and they all come within the spirit of this invention.

Referring to FIG. 4 a fully assembled clasp 100 is shown in the closed position. In this view, pin 20 is resting in stop 16A. This brings insert 15 in its most forward position with respect to casing 10 so that the leading edge 18 of insert 15 abuts with the top front portion 12 of casing 10. Obviously, by pushing insert 15 in a rearward direction relative to casing 10, pin 20 will rest in stop 16B thus providing access through opening 13 for the loop.

In another embodiment of the present invention, insert 15 may be modified so that stop 16A corresponds to the open position and stop 16B to the closed position. Referring to FIG. 8, insert 85 now includes a top front section 88 which closes opening 13 when insert 85 is in its rearmost position corresponding to pin 20 resting in stop 16B. In this embodiment, when insert 85 is in its front most position, corresponding to pin 20, in stop 16A, a loop can be made to pass through opening 13 and into recess 17 of the insert. This is in contrast to the first embodiment discussed where the loop came to rest in recess 19 of casing 10.

As for some of the non essential elements of casing 10 referred to above, opening 14 may be designed in casing 10 for insertion of insert 15. Similarly, holes 11 may be designed for insertion of pin 20. In this embodiment opening 14 and holes 11 may be closed after assembly of the clasp to prevent the pin and insert from separating from casing 10. Alternatively, casing 10 may be manufactured in halves with holes 11 not passing through to the outside of casing 10, rather only providing recesses within the inside walls of casing 10 to secure pin 20. In this embodiment the two halves of casing 10 may then be fastened together.

Referring to FIGS. 5–7, alternative embodiments of clasps are shown in clasps 50, 60 and 70. Clearly, the clasp of the present invention may be designed in various sizes, with decorative casings and with appendages, such as 72 for securing clasp 70 to a chain.

The foregoing merely illustrates the principles of the present invention. Those skilled in the art will be able to devise various modifications, which although not explicitly described or shown herein embody the principles of the invention and are thus within its spirit and scope.

What is claimed is:

1. A jewelry clasp, comprising:
   a casing at least partially hollow having at least one long axis running from a leading edge to a trailing edge, a top surface with an opening for receiving a loop to be secured by said clasp, and a recess within said casing accessible through said opening;
   an insert residing within said hollow of said casing and movable along the long axis of said casing, said insert having a leading edge and a first hole stop and a second hole stop, said first hole stop and second hole stop being connected via a passage; and
   a pin fixed in position within said casing perpendicular to said long axis of said casing, said pin passing through said insert at one of said stops.

2. The clasp of claim 1 where the insert is made of a material with dimensions such that passage between the first hole stop and the second hole stop is too narrow for the pin to pass through the casing without applied pressure to the pin, said applied pressure causing the insert to flex, widening the passage between the first and second stop position to allow the pin through.

3. The clasp of claim 1 where the insert has the first hole stop to correspond to an open position for the clasp and the second hole stop to correspond to a closed position for the clasp.

4. A necklace comprising a length of material having two opposing ends and a clasp whereby said opposing ends may be joined with said clasp to form a loop with said length of material, said clasp comprising:
   a casing at least partially hollow having at least one long axis running from a leading edge to a trailing edge, a top surface with an opening for receiving a loop to be secured by said clasp, and a recess within said casing accessible through said opening;
   an insert residing within said hollow of said casing and movable along the long axis of said casing, said insert having a leading edge and a first hole stop and a second hole stop, said first hole stop and second hole stop being connected via a passage; and
   a pin fixed in position within said casing perpendicular to said long axis of said casing, said pin passing through said insert at one of said stops.

5. The necklace of claim 4 where the insert is made of a material with dimensions such that passage between the first hole stop and the second hole stop is too narrow for the pin to pass through the casing without applied pressure to the pin, said applied pressure causing the insert to flex, widening the passage between the first and second stop position to allow the pin through.

6. The necklace of claim 4 where the insert has the first hole stop to correspond to an open position for the clasp and the second hole stop to correspond to a closed position for the clasp.

7. A bracelet comprising a length of material having two opposing ends and a clasp whereby said opposing ends may be joined with said clasp to form a loop with said length of material, said clasp comprising:
   a casing at least partially hollow having at least one long axis running from a leading edge to a trailing edge, a top surface with an opening for receiving a loop to be secured by said clasp, and a recess within said casing accessible through said opening;
   an insert residing within said hollow of said casing and movable along the long axis of said casing, said insert having a leading edge and a first hole stop and a second hole stop, said first hole stop and second hole stop being connected via a passage; and a pin fixed in position within said casing perpendicular to said long axis of said casing, said pin passing through said insert at one of said stops.

8. The bracelet of claim 7 where the insert is made of a material with dimensions such that passage between the first hole stop and the second hole stop is too narrow for the pin to pass through the casing without applied pressure to the pin, said applied pressure causing the insert to flex, widening the passage between the first and second stop position to allow the pin through.

9. The bracelet of claim 7 where the insert has the first hole stop to correspond to an open position for the clasp and the second hole stop to correspond to a closed position for the clasp.

* * * * *